June 26, 1956     J. J. RODTH     2,752,070
DEVICE FOR DISPENSING A MEASURED QUANTITY OF LIQUID
Filed Oct. 7, 1953     2 Sheets-Sheet 1
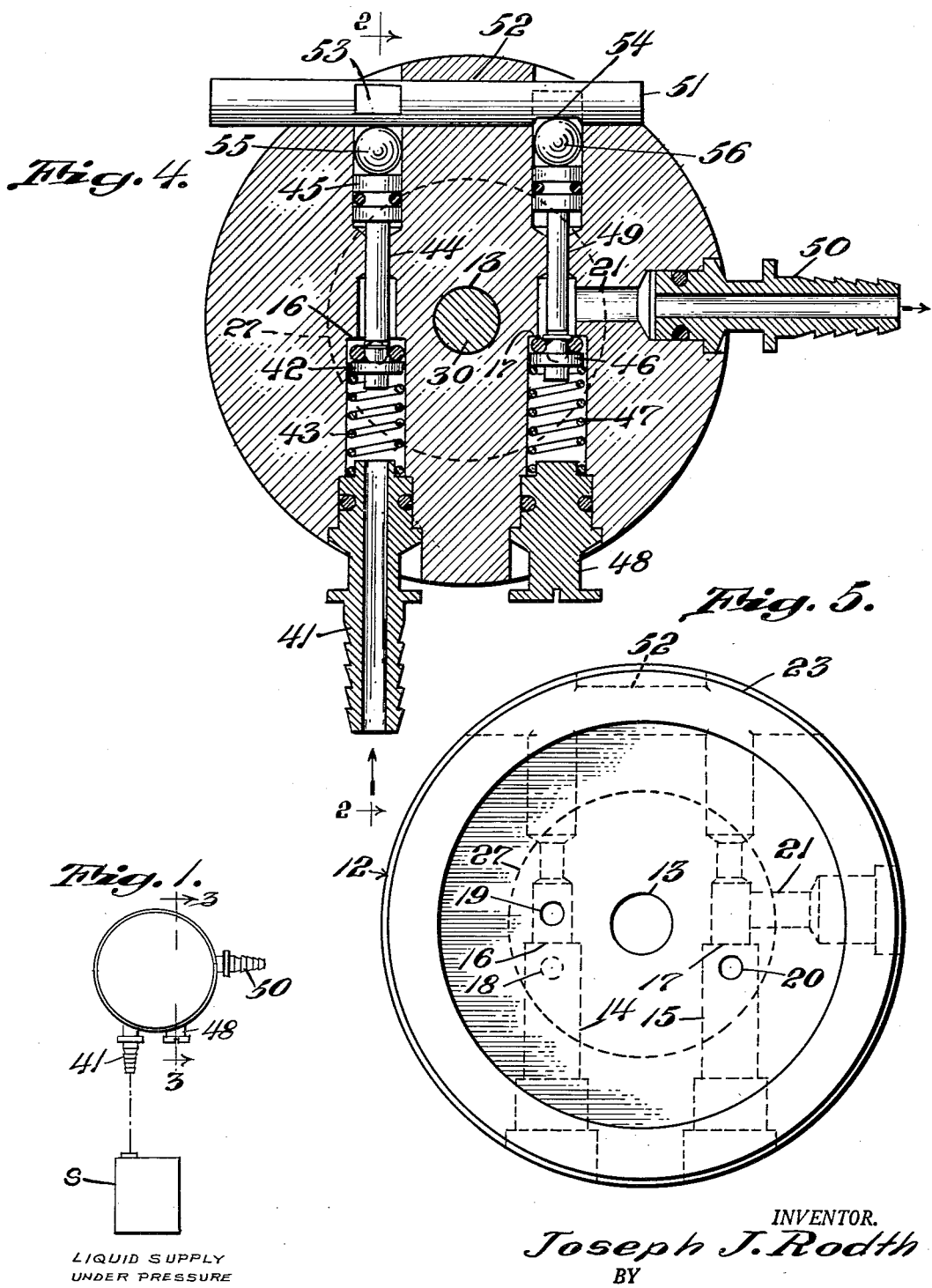
INVENTOR.
Joseph J. Rodth
BY
Barlow & Barlow
ATTORNEYS.

June 26, 1956 J. J. RODTH 2,752,070
DEVICE FOR DISPENSING A MEASURED QUANTITY OF LIQUID
Filed Oct. 7, 1953 2 Sheets-Sheet 2
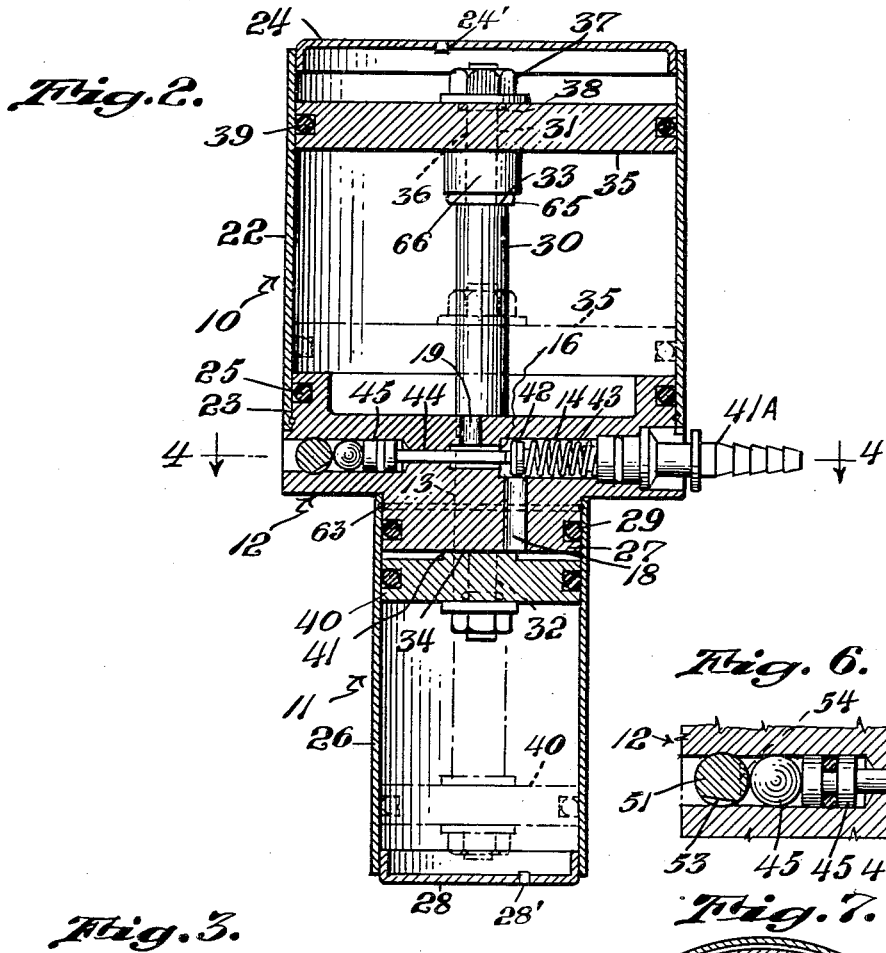
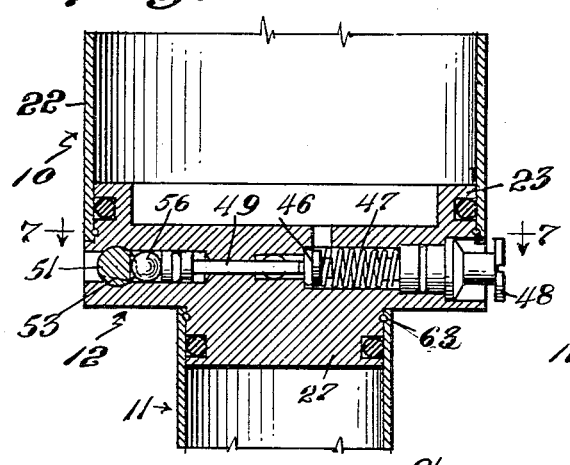
INVENTOR.
Joseph J. Rodth
BY
Barlow & Barlow
ATTORNEYS.

United States Patent Office 2,752,070
Patented June 26, 1956

2,752,070

DEVICE FOR DISPENSING A MEASURED QUANTITY OF LIQUID

Joseph J. Rodth, Swansea, Mass., assignor to Glenmore Corporation, a corporation of Massachusetts Application October 7, 1953, Serial No. 384,623

4 Claims. (Cl. 222—255)

This invention relates to a device for dispensing a measured quantity of liquid and has particular adaptation for use for dispensing a carbonated or non-carbonated liquid under pressure in a beverage dispensing machine of the automatic or non-automatic type.

In machines of this type at present, the use of electrically operated devices for measuring and dispensing a carbonated beverage has been found as most reliable. These electrically operated devices, however, include interlocking relays, switches, etc., which function to permit certain flow passages to open and others close for certain predetermined periods and depend upon maintaining various adjustments in the said devices. These electric elements are subject to atmospheric conditions and much mechanism is used to prevent over-supply of liquid at each cycle of operation of the machine. The various elements required in the make-up of the said devices result in a high production cost.

An object of the invention is to improve generally on devices for dispensing an accurate measure of liquid and provide an apparatus which will not be affected by atmospheric conditions and which will require little if any adjustment in use.

Another object is to provide a device so constructed as to be incapable of dispensing greater than a measured quantity of liquid at each cycle of operation thereof.

Another object is to provide a device in which the valves thereof will be mechanically operated.

Another object is to provide a device which will be actuated by the pressure of the liquid which it dispenses.

Another object is to provide a device in which a measuring cylinder will be operated by a smaller cylinder by means of a pressure differential provided across said cylinders.

A more specific object is to provide a pair of hydraulically operated cylinders, one of which will provide the measuring cylinder and the other will cause a hydraulic bias on the piston of said measuring cylinder to move the same to discharge its contents upon the closing of the inlet passage thereto.

Another object is to provide a device in which a pair of valves will be moved alternately from a closed to an open position by a single member.

With these and other objects in view, the invention consists of certain novel features of construction as will be more fully described and particularly pointed out in the appended claims.

In the accompanying drawings:

Figure 1 is a plan view of the device embodying my invention and showing diagrammatically the connection thereof to a supply liquid source under pressure;

Figure 2 is a longitudinal sectional view taken substantially along line 2—2 of Figure 4;

Figure 3 is a sectional view of a fragmentary portion of the device taken substantially along line 3—3 of Figure 1;

Figure 4 is a sectional view taken substantially along line 4—4 of Figure 2;

Figure 5 is a plan view of one end of the cylinder head of the device showing the flow passages therethrough;

Figure 6 is a sectional view on an enlarged scale of a fragmentary portion of the mechanism for controlling one of the valves of the device; and Figure 7 is a sectional view taken substantially along line 7—7 of Figure 3.

Figure 8 is an enlarged fragmentary view on Fig. 3, immediately above element 48, showing the resilient lock wire.

Referring particularly to Figure 2, the device according to the present invention comprises a measuring cylinder 10 and a smaller cylinder 11 which has the same axis as cylinder 10 and extends in tandem relation therewith and is connected thereto by a cylinder head 12 which is common to each cylinder. The head 12 (see Figure 5) is provided with an axial bore 13 and two bores similar to each other designated generally 14, 15 which extend laterally of the head and parallel to each other on each side of the bore 13 equally spaced therefrom and at right angles thereto. Each bore 14, 15 has a valve seat 16, 17, respectively, formed therein. A bore 18 extends from the bore 14 on the influent side of the valve seat 16 and opens into the smaller cylinder 11, while a bore 19 extends from the bore 14 on the other side of the valve seat 16 to open into the cylinder 10. Thus, there is formed passages through the cylinder head to each of said cylinders, one 18 being always open and the other 19 being valve controlled. A bore 20 extends from the bore 15 on one side of the valve seat 17 and opens into the cylinder 10. A lateral bore 21 extends inwardly from the side of the head 12 to intersect the bore 15 on the other side of the valve seat 17. Thus, there is formed an outlet passage from the cylinder 10 through the head 12, which is controlled by a valve engaging seat 17.

The cylinder 10 (see Figure 2) is formed by means of an open shell 22 which is snugly received on a flange 23 formed on one end of the head 12. The upper end of the shell is closed by a cap 24 which may be secured in place in any convenient manner as by means of a press fit. An O-ring seal 25 is positioned between the shell 22 and the flange 23 to seal the cylinder against leakage past the flange. The smaller cylinder but for size is similarly formed of a shell 26 which is snugly received on the reduced boss 27, and a cap 28 closes the other end of the shell 26 and is likewise secured in place by a press fit. An O-ring seal 29 is positioned between the shell 26 and boss 27 to seal the cylinder 11 against leakage past the said boss. Each shell may be held in place by a wire lock hereinafter described.

A piston rod 30 in the bore 13 reciprocates back and forth within the cylinders and has reduced threaded end portions 31, 32 which form shoulders 33 and 34, respectively. A piston 35 has a bore 36 which is received on the reduced portion 31 to rest against the shoulder 33 and is fixed in position by a washer and nut fastening 37. A packing seal 38 surrounds the end 31 beneath the washer so as to prevent leakage past the said end 31. The outer periphery of the piston is provided with an O-ring packing 39. A similar but smaller piston 40 is similarly fixed at the other end of the rod 30 and is provided with a reduced boss 41 to engage the boss 27 to provide a space between the piston 40 and said boss 27 at the inner limit of the stroke of the piston 40.

The bore 14 is the inlet passage to the cylinders and may be provided with any suitable fitting as 41A so as to connect the passage to a suitable source of liquid under pressure which may be a carbonated liquid supply illustrated merely diagrammatically in Figure 1 and indicated generally by S. The liquid under pressure passes through the fitting through bore 14 and through bore 18 to cylinder 11 and through bore 19 to cylinder 10. Thus, both cylinders are exposed to the same liquid pressure. Since piston 35 has a larger area exposed to said liquid pressure than piston 40, a pressure differential is provided in a direction tending to move the piston 35 outwardly and move the smaller piston 40 inwardly. The passage or bore 19 is controlled by means of a valve member 42 (see Figs. 2 and 4) which is biased to closed position on seat 16 by means of a compression spring 43, one end of which abuts against the valve member 42 and the other end against the fitting 41. A push pin or plunger 44 having an enlarged head 45 engages the valve member 42 to move the same to open position. Thus, the flow of liquid to cylinder 10 is valve controlled and the smaller cylinder 11 is under the constant pressure of said liquid.

The passage for the liquid from the cylinder 10 is controlled by a similar valve member 46 (see Figure 4) which is spring pressed to closed position on seat 17 by a compression spring 47, one end of which presses against the said valve member 46 and the other against a closure plug 48. A similar plunger or pin 49 engages the valve member 46 to push the same to open position. The bore 21 is provided with a fitting 50 to be connected in any appropriate manner such as a flexible tube (not shown) to the location at which the liquid from the cylinder 10 will be discharged.

In order that the valve members 42 and 46 may be controlled mechanically from a common source, a rod 51 is rotatably received in a bore 52 which intersects both of bores 14 and 15. The rod 51 is provided with similar cam surfaces 53, 54 at a position to be in line with the bores 14 and 15. A ball 55 is positioned between the head 45 of plunger 44 and the cam surface 53 and a similar ball 56 is positioned between the head 49a of plunger 49 and the cam surface 54. The cam surfaces are so related to each other that when one valve is open, the other is closed, and that the closing of one valve is slightly ahead of the opening of the other valve.

In the operation of the device so far described, the valve member 42 is normally held open and the valve member 46 is normally held closed. Assuming the liquid to be dispensed is a carbonated liquid under pressure from a suitable supply source S, the liquid will flow through bore 18 into cylinder 11 to act against piston 40, tending to move the same outwardly. Liquid will also flow past open valve member 42 and through bore 19 into cylinder 10 and press against piston 35, tending to move the same outwardly. The area of the piston 35 exposed to the liquid pressure is larger than the area of the piston 40 exposed to said pressure. Consequently the pressure acting on the larger piston 35 will overcome the pressure acting on the smaller piston and will move outwardly to the full-line position shown in Figure 2 and the smaller piston 40 will be moved to the full-line position shown in this Figure 2. Upon rotating the rod 51 in a clockwise direction, looking at the left end of the rod 51 (Fig. 4), the valve member 42 under urge of spring 43 will move to closed position and shut off further flow of liquid into cylinder 10. Upon further movement of the rod 51 in the same direction, the plunger through action of the cam surface 54, ball 56 will move the valve 46 to open passage 20 to permit the passage of liquid past valve seat 17 and out through bore 21 and fitting 50 to be discharged usually at atmospheric pressure. Upon the opening of passage 20 there will be a drop in the pressure in cylinder 10. The piston 40 is under constant pressure of the liquid from the supply source and will overcome the reduced pressure in cylinder 10 and will be moved outwardly by the pressure therein to the broken-line position shown in Figure 2 and move the piston 35 inwardly to force the liquid ahead of it out through the discharge passage 20. In the movement of either piston outwardly, the air trapped between the cap 24 or 28 will be compressed and act as a cushion for said pistons at the end of the outward stroke thereof. A cushion is, however, not necessary and the bleed hole 24' or 28' may be opened if desired. Consequently the outwardly stroke of each piston will provide a cushion for the inwardly stroke of the other piston. Upon the discharge of the liquid from the measuring cylinder 10, the rod 51 may be moved in the opposite direction to close the valve member 46 and re-open the valve 42 to again set the device for another similar cycle of operation. It will be apparent that in arranging for one valve to be first closed prior to opening of the other valve by forming the cams 53, 54 on a single rod 51, a so-called jack pot is effectively prevented; that is, at each cycle of operation one valve must be open and the other closed, thus there can be only a discharge of the contents of the measuring cylinder when the valve 42 is open.

It is very desirable in devices of this character that the assembly of the parts, particularly the cylinders, is such as to permit the ready access to various elements for cleansing the same. Accordingly (see Figures 7 and 8) the cylinder head 12 has formed at the flange portion 23 thereof an annular groove 58 which mates with the groove 57. The shell 22 has a circumferential slot 59 which extends inwardly to intersect the said groove 58. The shell is rotatable about the flange to register the said slot 59 with a radial hole 60 in the groove 57. A resilient lock wire 61 having a hook 62 formed at one end thereof is inserted in said slot 59 to insert the hook 62 into said opening 60 so as to anchor the wire in the groove 57. Now turning or rotating the shell towards the wire will engage and lay the wire into the said matched grooves to lock the shell to the cylinder head. To remove the shell 22, the same is turned to register the slot 59 with the free end of the wire which upon being opposite to said slot will spring outwardly as shown in broken lines in Figure 7. Upon rotating the shell towards the spring end portion of the wire, the same will be unthreaded from the grooves and thus removable to permit separation of shell 22 with head 12. The shell 26 is similarly secured to the boss 27 by a similar lock wire 63 (Fig. 3). The fittings 41, 50 and plug 48 are frictionally held in place and may be pulled out of their bores to permit withdrawing of the springs and valve members therein. Turning the rod 51 to register the balls 55, 56 with the uncut circumference of said rod will permit withdrawal of the rod from the bore 52 and free the said balls and the plungers 44, 49 to be withdrawn from their bores, thus freeing the passages through the head 12 to provide for a proper cleansing thereof. Thus, the various elements of the device may be easily dismantled and assembled manually without the aid of tools, which is very desirable in a device of this character.

In order to avoid leakage past the piston rod 30 and walls of bore 13 when the valve 42 is seated and a pressure builds up in small cylinder 11, an O-ring seal 65 (Fig. 2) is positioned between shoulder 33 and the boss 66 of piston 35 to engage against the cylinder head 12 about the bore 13. Thus when the piston 35 is at its innermost position the clearance between rod 30 and bore 13 will be sealed against leakage.

I claim:

1. A device for dispensing a measured quantity of liquid comprising a pair of hydraulic cylinders spaced from each other by a common cylinder head, said cylinders each having a piston thereof connected to each other for movement in unison in the same direction, internal passages formed entirely within said head for connecting said cylinders to a supply of liquid under pressure, one of said cylinders being of larger diameter than the other and means whereby the smaller of the cylinders may be constantly exposed to said liquid under pressure acting on the piston thereof in a direction tending to oppose movement of the piston of larger diameter when exposed to said liquid under pressure, a discharge passage from the larger of said cylinders open to the atmosphere, means for controlling said supply passage to said larger cylinder and means for controlling the discharge passage whereby upon closing of the said supply passage to said larger cylinder and opening of said discharge passage, a pressure drop will be had in the said larger cylinder and the pressure acting on said piston of the smaller cylinder will overcome the pressure acting on the piston of the larger cylinder to move the smaller piston and the larger piston connected thereto to discharge the said liquid in the larger cylinder.

2. A device as set forth in claim 1 wherein a valve is at a position in the supply passage to the said larger cylinder to control the flow thereto and a valve is at a position in the discharge passage from said larger cylinder to control the flow therefrom.

3. A device as set forth in claim 1 wherein a spring pressed valve is at a position in the supply passage to the said larger cylinder and a spring pressed valve is at a position in the discharge passage from said larger cylinder.

4. Mechanism for dispensing a measured quantity of liquid comprising, a pair of hydraulic cylinders spaced from each other by a common cylinder head, said cylinders having the pistons thereof connected to each other for movement in unison in the same direction, internal passages formed entirely within the cylinder head for connecting said cylinders to a supply of the liquid under pressure, one of said cylinders being of larger diameter than the other and means whereby the smaller of said cylinders is constantly exposed to the liquid under pressure acting on the piston thereof in a direction tending to oppose movement of the piston of said cylinder of larger diameter when exposed to the liquid under pressure, a discharge passage from the larger of said cylinders open to the atmosphere, means for controlling said supply passage to said larger cylinder, and means for controlling the discharge passage whereby upon the closing of said supply passage to said larger cylinder and the opening of said discharge passage, a pressure drop is created in said larger cylinder and the pressure acting on the piston of said smaller cylinder overcomes the pressure acting on the piston of said larger cylinder to move the smaller piston and the larger piston connected thereto discharging the liquid in said larger cylinder.

References Cited in the file of this patent
UNITED STATES PATENTS
1,769,499  Du Puy ---------------- July 1, 1930